United States Patent [19]

Scheuble et al.

[11] Patent Number: 4,737,311
[45] Date of Patent: Apr. 12, 1988

[54] LIQUID CRYSTAL PHASE

[75] Inventors: Bernhard Scheuble, Alsbach; Georg Weber, Erzhausen, both of Fed. Rep. of Germany; Kiyohiko Kawamoto, Atsugi, Japan; Rudolf Eidenschink, Münster; Reinhard Hittich, Modautal, both of Fed. Rep. of Germany

[73] Assignee: Merck Patent Gesellschaft mit beschrankter haftung, Darmstadt, Fed. Rep. of Germany

[21] Appl. No.: 720,313

[22] Filed: Apr. 5, 1985

[30] Foreign Application Priority Data

Apr. 7, 1984 [DE] Fed. Rep. of Germany ....... 3413148
Sep. 14, 1984 [DE] Fed. Rep. of Germany ....... 3433708

[51] Int. Cl.$^4$ .......... G02F 1/13; C09K 19/30; C09K 19/32; C09K 19/34
[52] U.S. Cl. .......... 252/299.61; 252/299.1; 252/299.6; 252/299.62; 252/299.63; 252/299.5; 350/332; 350/333; 350/349; 350/350 R; 350/350 S
[58] Field of Search .......... 252/299.61, 299.62, 252/299.5, 299.63, 299.1, 299.6; 350/350 R, 350 S, 332, 333, 349

[56] References Cited

U.S. PATENT DOCUMENTS

| | | | |
|---|---|---|---|
| 4,130,502 | 12/1978 | Eidenschink et al. | 252/299.63 |
| 4,181,625 | 1/1980 | Eidenschink et al. | 252/299.63 |
| 4,229,315 | 10/1980 | Frause et al. | 252/299.63 |
| 4,330,426 | 5/1982 | Eidenschink et al. | 252/299.63 |
| 4,331,552 | 5/1982 | Eidenschink et al. | 252/299.63 |
| 4,398,803 | 8/1983 | Pohl et al. | 252/299.5 |
| 4,410,445 | 10/1983 | Bahr et al. | 252/299.63 |
| 4,415,470 | 11/1983 | Eidenschink et al. | 252/299.63 |
| 4,419,264 | 12/1983 | Eidenschink et al. | 252/299.5 |
| 4,431,853 | 2/1984 | Sato et al. | 252/299.63 |
| 4,464,283 | 8/1984 | Hasegawa et al. | 252/299.63 |
| 4,507,222 | 3/1985 | Inoue et al. | 252/299.63 |
| 4,510,069 | 4/1985 | Eidenschink et al. | 252/299.63 |
| 4,544,497 | 10/1985 | Abdullah et al. | 252/299.62 |
| 4,550,980 | 11/1985 | Shinsu | 252/299.63 |
| 4,606,845 | 8/1986 | Romer et al. | 252/299.63 |
| 4,617,140 | 10/1986 | Eidenschink et al. | 252/299.63 |
| 4,622,163 | 11/1986 | Huynh-Ba et al. | 252/29.63 |
| 4,622,164 | 11/1986 | Eidenschink et al. | 252/299.5 |

FOREIGN PATENT DOCUMENTS

| | | | |
|---|---|---|---|
| 8501295 | 3/1985 | European Pat. Off. | 252/299.63 |
| 57-171936 | 10/1982 | Japan | 252/299.63 |
| 58-19381 | 2/1983 | Japan | 252/299.63 |
| 58-225179 | 12/1983 | Japan | 252/299.63 |
| 59-70624 | 4/1984 | Japan | 252/299.63 |
| 2092169 | 8/1982 | United Kingdom | 252/299.63 |

Primary Examiner—Teddy S. Gron
Attorney, Agent, or Firm—Millen & White

[57] ABSTRACT

A liquid crystal phase containing at least one component selected from Group C compounds of the formulae VII to X

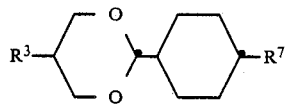

VII

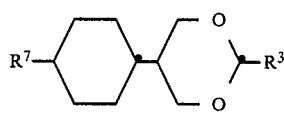

VIII

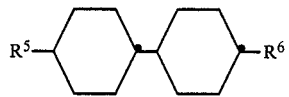

IX

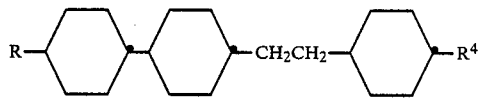

X has particularly advantageous properties.

13 Claims, No Drawings

LIQUID CRYSTAL PHASE

BACKGROUND OF THE INVENTION

The invention relates to liquid crystal phases (LC phases) with low optical anisotropy and wide nematic phases.

The properties of nematic or nematic-cholesteric liquid crystal materials are being increasingly utilized for liquid crystal display elements (LC display elements) to significantly modify their optical properties, such as light absorption, light scattering, birefringence, refractance or color under the influence of electrical fields. The function of such display elements here is based, for example, on the phenomena of dynamic scattering, the deformation of aligned phases, the guest-host effect, the Schadt-Helfrich effect in the twisted cell or the cholesteric-nematic phase transfer.

Liquid crystal phases which must fulfil a large number of requirements are required for industrial application of these effects in electronic components. Chemical stability towards moisture, air and physical influences, such as heat, infrared, visible and ultraviolet radiation and constant and alternating electrical fields, are particularly important here. Furthermore, a liquid crystal mesophase in a suitable temperature range and the lowest possible viscosity at room temperature are required of industrially usable liquid crystal dielectrics. Finally, they should not exhibit intrinsic absorption in the range of visible light, that is to say they must be colorless.

In none of the previously known series of compounds with liquid crystal mesophases is there an individual compound which meets all these requirements. Mixtures of two to twenty, preferably three to fifteen, compounds are therefore as a rule prepared in order to obtain substances which can be used as liquid crystal phases. At least one compound of low melting point and clear point is usually included in this mixture. A mixture is usually obtained here with a melting point below that of the component of lower melting point, while the clear point is between the clear points of the components. However, optimum phases cannot easily be prepared in this manner, since the components of high melting point and clear points frequently also impart a high viscosity to the mixtures. The switching times in the electrooptical display elements produced with these mixtures are thereby increased in an undesirable manner.

The invention is based on the object of preparing liquid crystal phases which have a nematic phase in the required temperature range and allow adequately short switching times in liquid crystal cells at room temperature.

A large number of liquid crystal phases based on a large number of compounds are already commerically available. However, there is still a great need for liquid crystal phases with high clear points, lower melting points, low viscosity (and hence short switching times) and low optical anisotropy. Liquid crystal phases with a wide mesophase range, low viscosity, low optical anisotropy, steep characteristic transmission line and relatively highly negative dielectric anisotropy are particularly required for so-called guest-host displays with positive contrast (the information appears in dark form on a light background) (T. J. Scheffer, Phil. Trans. R. Soc. Lond. A 309 (1983) 189; and F. Gharadjedazki and R. Voumasd, J. Appl. Phys. 53 (1982) 7306). Moreover, the liquid crystal phases must have a high stability to UV and take up the dichroic dyestuffs to a sufficient degree. Such negative LC phases were not hitherto available. For wide-range mixtures, for example for external applications, the product of the layer thickness and optical anisotropy must have quite specific values, for example about 1.0 or about 0.5, since otherwise the angle-dependency of the contrast becomes too great and interference colors arise, impairing the optical phenomenon. A coating thickness of about 6-7 micrometers and a liquid crystal phase with a positive dielectric anisotropy and an optical anisotropy of about $+0.07$ to about $+0.08$ are today generally employed for such TN cells in order to achieve a particularly good angle-dependency of the contrast. It is particularly difficult to achieve sufficiently high clear points while at the same time avoiding the occurrence of smectic phases and viscosity values which are too high at low temperatures. Such positive LC phases have not hitherto been available.

SUMMARY OF THE INVENTION

It is an object of the invention to provide new liquid crystal phases which fulfill the foregoing requirements to a high degree.

Upon further study of the specification and appended claims, further objects and advantages of this invention will become apparent to those skilled in the art.

It has now been found that liquid crystal phases with particularly advantageous combinations of material properties, in particular wide mesophase ranges and low optical anisotropy, are obtained if they contain at least one component from Group A compounds of the formulae I to IV

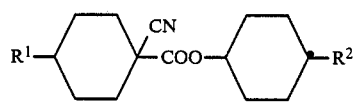
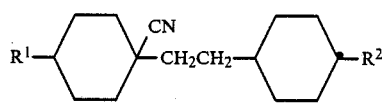

wherein $R^1$ and $R^2$ are each independently R,

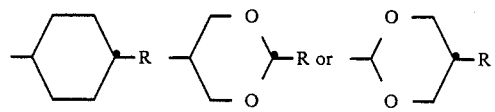

and R is alkyl with 1 to 12 C atoms wherein also one or two non-adjacent $CH_2$ groups can be replaced by $-O-$, $-CO-$, $-O-CO-$ or $-CO-O-$,

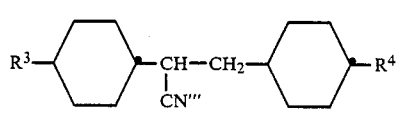

wherein $R^3$ and $R^4$ are each independently R or

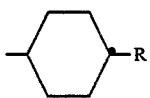

and R has the abovementioned meaning, and/or at least one component selected from Group B compounds of the formulae V and VI

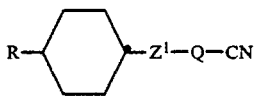

V

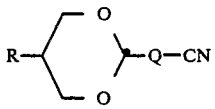

VI wherein R has the abovementioned meaning, Q is

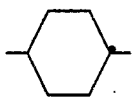

or

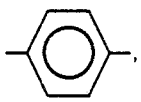

and $Z^1$ is

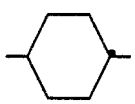

a single bond, —CH$_2$CH$_2$—, —CO—O— or —O—CO—, and at least one component selected from Group C compounds of the formulae VII to X

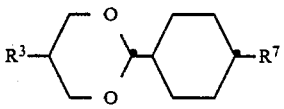

VII

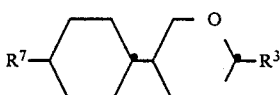

VIII

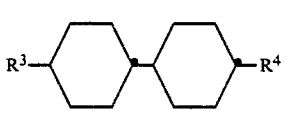

IX

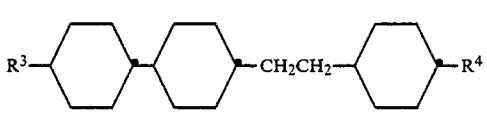

X wherein $R^3$ and $R^4$ have the abovementioned meaning and $R^7$ can assume the meaning of

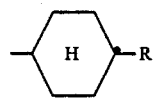

V or $R^8$, wherein R is as defined above, and $R^8$ is alkyl with 1 to 12 C atoms wherein also one or two non-adjacent CH$_2$ groups can be replaced by —O— or —CO—, and, if appropriate, one or more components selected from Group D compounds of the formulae XI to XIII

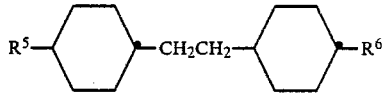

XI

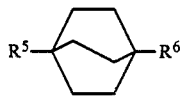

XII

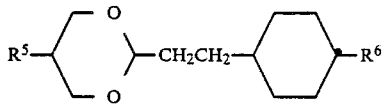

XIII wherein $R^5$ and $R^6$ in each case independently of one another are alkyl with 1 to 12 C atoms wherein also one or two non-adjacent CH$_2$ groups can be replaced by —O—, —CO—, —O—CO— or —CO—O—, and if appropriate, one or more components slected from Group E compounds of the formulae XIV and XV

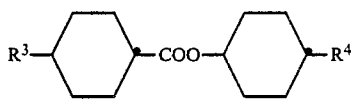

XIV

XV wherein $R^3$ and $R^4$ are each independently R or

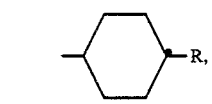

$R^9$ is R,

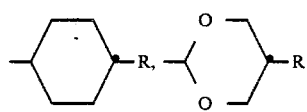

or, if n equals 2, also CN, n is 2 or, if $R^3$ equals

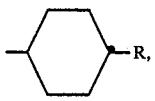

also 1 and A is a 1,4-phenylene group which is optionally fluorinated in the 2- or 3-position, with the proviso that, if compounds of the formula V and/or VI wherein Q is 1,4-phenylene are present, the liquid crystal phase contains at least one component of the formula IX wherein $R^3$ is n-alkyl and $R^4$ is n-alkyl, n-alkoxy or n-alkanoyloxy with in each case 1-12 C atoms, and at least one component from Group E.

The invention thus relates to the liquid crystal phases described above, which can also contain, if appropriate, two or more pleochroic dyestuffs, and to the use of these phases in liquid crystal display elements.

The invention furthermore relates to liquid crystal display elements containing such phases.

DETAILED DESCRIPTION OF THE INVENTION

Although display elements which are free from interference colors and which contain dielectrics with positive dielectric anisotropy and low optical anisotropy, preferably in the range from 0.05 to 0.10, are already known from German Offenlegungsschrift No. 3,022,818, the LC phases described therein do not allow an operating temperature range which permits external applications. Surprisingly, it has now been found that a sufficiently wide operating temperature range, in particular also for external applications, is possible with the positive LC phases according to the invention, the occurrence of smectic phases and/or very high viscosity values at low temperatures being at the same time largely eliminated.

The negative liquid crystal guest-host systems according to the invention are particularly distinguished by a low optical anisotropy, excellent stability and high degrees of order of the dyestuffs. By providing the liquid crystal guest-host systems according to the invention, the applicability of such systems is also considerably increased from various technological viewpoints. The liquid crystal guest-host systems according to the invention and electrooptical display elements containing them can be provided for the most diverse applications, depending on the selection of the components of the host material and of the pleochroic dyestuffs.

The negative LC guest-host systems according to the invention furthermore contain at least two, preferably 2 to 5, and in particular 3 or 4, pleochroic dyestuffs. In principle, all the pleochroic dyestuffs suitable for guest-host mixtures can be used as the dyestuffs. The most important of these dyestuffs belong to the classes of anthraquinone, naphthoquinone, azo, indigo, and/or perylene dyestuffs.

A rich variety of these dyestuffs are described in the literature. The expert can seek out the most suitable dyestuffs for the particular intended application without difficulty. Thus, for example, anthraquinone dyestuffs are described in European Patent No. 34,832, European Patent No. 44,893, European Patent No. 48,583, European Patent No. 54,217, European Patent No. 56,492, European Patent No. 59,036, British Patent No. 2,065,158, British Patent No. 2,065,695, British Patent No. 2,081,736, British Patent No. 2,082,196, British Patent No. 2,094,822, British Patent No. 2,094,825, Japanese Preliminary Published Application No. 55-123,673, Japanese Preliminary Published Application No. 56-112,967, Japanese Preliminary Published Application No. 57-165,456, Japanese Preliminary Published Application No. 59-020,355, German Patent No. 3,017,877, German Patent No. 3,040,102, German Patent No. 3,048,552, German Patent No. 3,100,533, German Patent No. 3,115,147, German Patent No. 3,115,762, German Patent No. 3,150,803, German Patent No. 3,201,120 and German Patent No. 3,309,045, naphthoquinone dyestuffs are described in German Patent Nos. 3,126,108 and 3,202,761, azo dyestuffs are described in European Patent No. 43,904, German Patent No. 3,123,519, German Patent No. 3,238,702 (blue tetra azo dyes), German Patent No. 3,245,751, German Patent No. 3,309,048, PCT WO 82/2054, British Patent No. 2,079,770, Japanese Preliminary Published Application No. 56-57,850, Japanese Preliminary Published Application No. 56-104,984, Japanese Preliminary Published Application No. 55-052,375, Japanese Preliminary Published Application No. 59-096-171, Japanese Preliminary Published Application No. 59-093,776, U.S. Pat. No. 4,308,161, U.S. Pat. No. 4,308,162, U.S. Pat. No. 4,340,973, T. Uchida, C. Shishido, H. Seki and M. Wada: Mol. Cryst. Liq. Cryst. 39, 39-52 (1977) and H. Seki, C. Shishido, S. Yasui and T. Uchida: Jpn. J. Appl. Phys. 21, 191-192 (1982) and perylenes are described in European Patent No. 60,895, European Patent No. 68,427 and PCT WO 82/1191.

Some groups of these classes of dyestuffs are described in still more detail below:

(a) anthraquinone dyestuffs with S-alkyl, S-cycloalkyl and/or S-aryl groups, for example of the formula II'

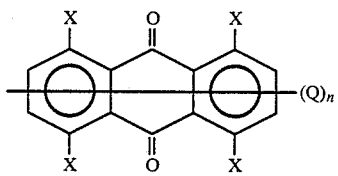

wherein Q is $NH_2$, OH, alkyl, aryl, $NO_2$ or halogen, n is 0, 1, 2, 3 or 4, X is in each case H, SR, $NZ_1Z_2$ or Q, R is in each case alkyl, aryl or cycloalkyl and $Z_1$ and $Z_2$ are in each case H, alkyl, aryl or cycloalkyl (such dyestuffs are known, for example, from European Patent No. 0,059,036), and (b) anthraquinone dyestuffs with substituted phenyl and/or cyclohexyl groups, for example of the formula III'

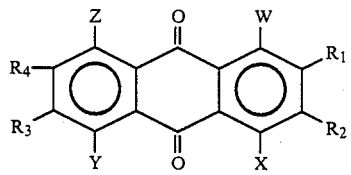

wherein W, X, Y and Z are hydrogen, $NH_2$, OH, $NHCH_3$ or $NHC_2H_5$ and one or two of the radicals $R_1$, $R_2$, $R_3$ and $R_4$ are a group of the partial formula —Ph—R, —Ph—OR, —Cy—R, —Ph—Cy—R or —Cy—Cy—R and the others are hydrogen, wherein R is an alkyl group with 1-12 carbon atoms (such dyestuffs are known, for example, from German Patent No. 3,040,102), and (c) naphthoquinone dyestuffs, for example of the formula IV'

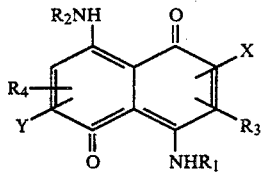

IV' wherein X and Y are identical or different and are hydrogen, chlorine or bromine, $R_1$, $R_2$, $R_3$ and $R_4$ are hydrogen, alkyl or alkoxyalkyl with up to 8 C atoms or a cyclic group Z, Z is —Ph—R, —Ph—Ph—R, —Cy—R, —Cy—Cy—R, —Ph—Cy—R or —Cy—Ph—R and R is alkyl, alkoxy, alkoxyalkyl, alkoxyalkoxy or alkanoyloxy with up to 8 C atoms (such dyestuffs are known, for example, from German Patent No. 3,126,108), and (d) azo dyestuffs, for example of the formula V'

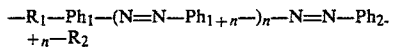

V' wherein $R_1$ is alkyl or alkylsulfonyl, $R_2$ is dialkylamino, monoalkylamino or a 5-membered or 6-membered cycloalkylamino group and n is 1, 2 or 3, it being possible for a second benzene ring to be fused onto the benzene ring to form naphthalene structures (such dyestuffs are known, for example, from U.S. Pat. No. 4,340,973), and/or (e) azo dyestuffs, for example of the formula VI'

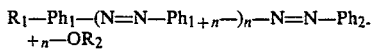

VI' wherein $R_1$ is alkyl, $R_2$ is alkyl, alkylcarbonyl, arylcarbonyl or alkoxycarbonyl and n is 1, 2, 3 or 4, it being possible for a second benzene ring to be fused onto the benzene rings to form naphthalene structures (such dyestuffs are known, for example, from Japanese Preliminary Published Application No. 56-104,984.

The guest-host systems according to the invention can be adapted to suit the most diverse fields of application by appropriate choice of the dyestuff components and of the relative dyestuff concentrations.

The guest-host systems according to the invention as a rule contain 0.1 to 15, preferably 0.5 to 10 and in particular 1 to 7, % by weight of pleochroic dyestuffs.

The pleochroic dyestuffs of the guest-host system according to the invention are preferably chosen so that they cover a suitable portion of the visible spectrum and that the absorption in this range is more or less constant.

The guest-host systems according to the invention are prepared in a manner which is customary per se. As a rule, the desired amounts of the various pleochroic dyestuffs are dissolved in the host material, advantageously at elevated temperature.

However, it is also possible to mix solutions of the pleochroic dyestuff and the host material in a suitable organic solvent, for example acetone, chloroform or methanol, and, after thorough mixing, to remove the solvent again, for example by distillation under reduced pressure. In this procedure, it must of course be ensured that no impurities or undesirable doping substances are included through the solvent.

The individual compounds of the formulae I-XV of the liquid crystal phases according to the invention are either known, or their methods of preparation can be easily deduced from the prior art by the relevant expert since they are based on standard processes described in the literature.

Corresponding compounds are described, for example, in German Offenlegungsschrift No. 3,231,707, German Offenlegungsschrift No. 3,321,373, German Offenlegungsschrift No. 2,702,598, German Offenlegungsschrift No. 2,948,836, U.S. Pat. No. 4,323,473, U.S. Pat. No. 4,325,830, U.S. Pat. No. 4,322,354, German Offenlegungsschrift No. 3,320,024, German Offenlegungsschrift No. 3,332,691, German Offenlegungsschrift No. 3,328,638, German Offenlegungsschrift No. 3,100,142, German Offenlegungsschrift No. 2,429,093, German Offenlegungsschrift No. 2,944,905, German Offenlegungsschrift No. 3,227,916, German Offenlegungsschrift No. 3,206,269, German Offenlegungsschrift No. 3,933,611, German Offenlegungsschrift No. 2,800,553, German Offenlegungsschrift No. 2,636,684, German Offenlegungsschrift No. 2,927,277, German Offenlegungsschrift No. 3,117,152 and German Offenlegungsschrift No. 3,042,391.

Surprisingly, it has been found that the compounds VII to X can particularly advantageously be used as components of positive and negative phases according to the invention which have wide nematic ranges and little or no interfering smectic phase ranges.

The negative LC phases according to the invention preferably contain 20 to 90%, in particular 55 to 85%, of compounds from Group A. They preferably contain at least two, in particular two to ten, and particularly preferably three to six, different compounds from Group A and no compounds from Group B.

The negative LC phases according to the invention with at least one, preferably two to four, compound(s) of the formula XIV are furthermore preferred.

The positive LC phases according to the invention preferably contain 15 to 60%, in particular 22 to 45%, of compounds from group B. They preferably contain only those compounds from Group B wherein all Q's are 1,4-phenylene or all Q's are 1,4-cyclohexylene. However, LC phases containing several compounds from group B wherein Q is in some cases 1,4-phenylene and in some cases 1,4-cyclohexylene are also of interest.

Preferred components selected from Group B are those of the formulae Va to Vd, VIa and VIb:

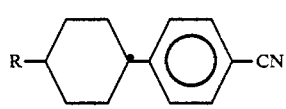

Va

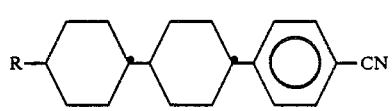

Vb

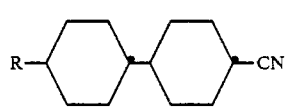

Vc

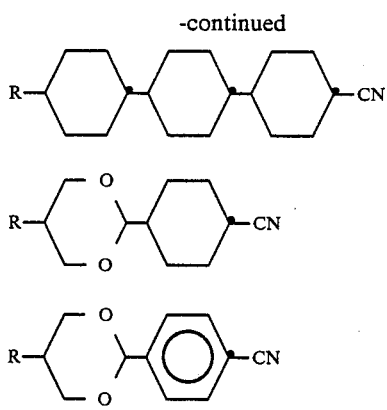

Vd

VIa

VIb

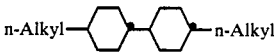 IXa

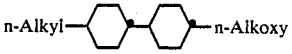 IXb

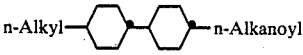 IXc

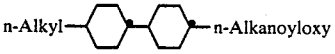 IXd

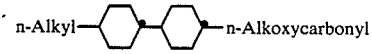 IXe

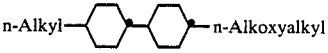 IXf

 IXg

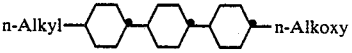 IXh

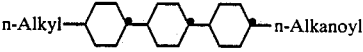 IXi

 IXj

 IXk

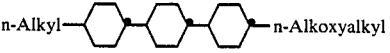 IXl

Of these, those of part formulae Va, Vb, Vd and VIa are particularly preferred. Furthermore preferred are compounds of formula V, wherein $Z^1$ is —CH$_2$CH$_2$— or a single bond and Q is trans-1,4-cyclohexylene.

The positive LC phases according to the invention preferably contain at least two, in particular at least three, compounds from Group B. Positive LC phases according to the invention with at least one, preferably two to six and in particular four to six, compound(s) of the formula XIV and/or at least one, preferably two to four, compound(s) of the formula XV are furthermore preferred.

Of the positive or negative liquid crystal phases according to the invention, those which contain at least three components selected from group A or B and at least one component selected from Group C are particularly preferred. Those phases according to the invention which contain at least three components from group A or B and at least one component from Group D are furthermore preferred. The phases according to the invention containing compounds from group C, in particular compounds of formula IXb, are superior by very short switching times, in particular at low temperatures.

Preferred LC phases do not contain compounds of the formulae VI and VII at the same time.

Preferred compounds from Group C are those of the formulae VII and IX. Compounds of the formula IX wherein $R^3$ is straight-chain alkyl with 1 to 12 C atoms and wherein a CH$_2$ group can also be replaced by —O—, —CO—, —O—CO— or —CO—O—, and $R^4$ is straight-chain alkyl with 1 to 12 C atoms, in particular n-propyl or n-pentyl, or

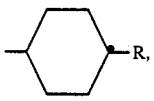

wherein R equals n-alkyl with 1–12 C atoms, in particular with 2 to 7 C atoms, are particularly preferred. In this case, $R^3$ is particularly preferably n-alkyl, n-alkoxyalkyl, n-alkoxy or n-alkanoyloxy with in each case 2 to 7 C atoms. Especially preferred meanings of $R^3$ here are, in particular, methoxy, ethoxy, n-butoxy, n-hexoxy, n-hexanoyloxy, n-butyryloxy and formyloxy.

Preferred LC phases according to the invention contain at least two, in particular at least three, components selected from the group of the formulae IXa to IXl:

Of the compounds of the formulae IXa to IXl, those of the formulae IXa, IXb, IXd, IXg, IXh and IXj are particularly preferred.

LC mixtures containing in each case at least one component of the formulae IXa, IXb and IXd at the same time are particularly preferred.

LC mixtures containing in each case at least one component of the formulae IXb and IXd and LC mixtures which contain only components of the formula IXb in group C are furthermore preferred. LC mixtures which, besides at least one component selected from the formulae IXa to IXf, contain at least one other component selected from the formulae IXg to IXl, in particular IXg, IXh, IXi and/or IXj, are also preferred.

Furthermore preferred are LC mixtures according to the invention containing at least one, in particular at least two, compounds of formula X, wherein $R^3$ and $R^4$ are each independently n-alkyl having 2 to 7 C-atoms.

In the compounds of the formulae V and VI, R is preferably n-alkyl or n-alkoxyalkyl with in each case 2 to 9 C atoms. $Z^1$ in formula V is preferably trans-1,4-cyclohexylene or a single bond, in particular a single bond.

Those liquid crystal phases according to the invention in which the total amounts by weight of the component(s) of the formula XV and the component(s) of the formulae V and/or VI wherein Q is in each case 1,4-phenylene is $\leq 50\%$, in particular, $\leq 40\%$, and/or is in the range from 5 to 50%, in particular in the range from 13 to 35%, exhibit particularly advantageous properties.

Of the compounds of components I, II, III and IV from Group A, those in which $R^1$ and $R^2$ are at the same time R, R being alkyl with 1-12 C atoms, and wherein also one or two non-adjacent $CH_2$ groups can be replaced by —O—, —CO—, —O—CO— or —CO—O—, are preferred. Those compounds of components I to IV in which $R^1$ and $R^2$ are both optionally, but not at the same time, R or

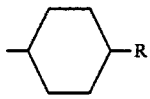

are furthermore preferred.

Of the preferred compounds VII and VIII from Group C, those in which $R^3$ is R and $R^7$ is $R^8$ (with the meanings given) or both optionally but not at the same time are $R^3$ or, respectively, $R^8$ or

are also to be mentioned. Of the wing groups $R^8$, those in which $R^8$ is alkyl with 1 to 12 C atoms are furthermore preferred.

Of the compounds of component IX, those in which $R^3$ always has the meaning defined for R and $R^4$ is optionally R, OR, —O—COR, —COOR or —$CH_2$OR are preferred.

Preferred phases according to the invention contain 12 to 70%, in particular 18 to 55%, of compounds from Group C.

Of the compounds of component X, those in which $R^3$ and $R^4$ at the same time have the meaning of R or $R^3$ has the meaning of R and $R^4$ is

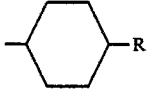

are preferably to be mentioned. Of the compounds of components XI, XII and XIII from Group D, all those in which $R^5$ and $R^6$ at the same time have the meaning given for R, in particular n-alkyl with 2 to 7 C atoms, are preferred. From the optional Group E, those compounds of the formula XIV in which $R^3$ and $R^4$ either at the same time are R or both optionally, but not at the same time, can assume the meaning of R or

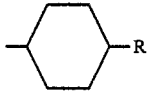

and the symbols R in each case independently of one another are an n-alkyl group with 2 to 7 C atoms are preferred.

Of the numerous compounds of the formula XV, which always contain phenyl, those of the formulae XVa to XVl are particularly preferred:

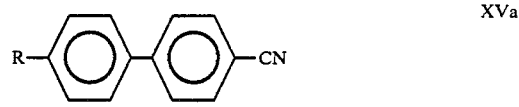
XVa

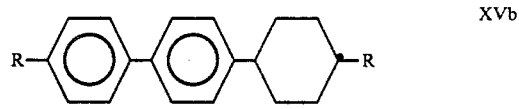
XVb

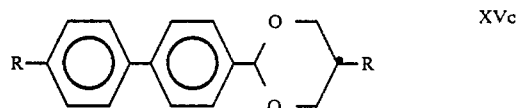
XVc

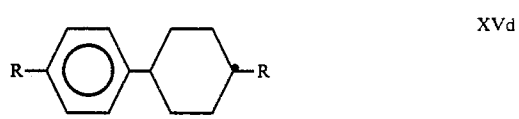
XVd

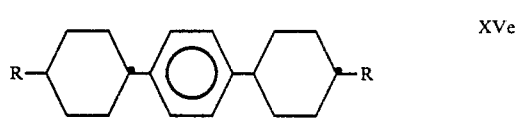
XVe

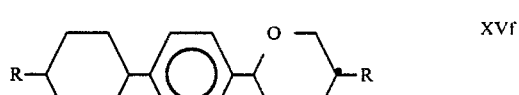
XVf

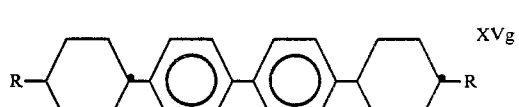
XVg

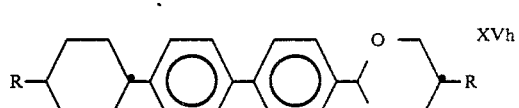
XVh

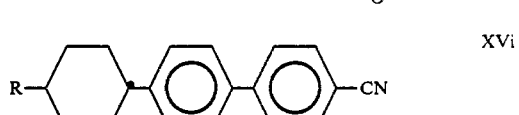
XVi

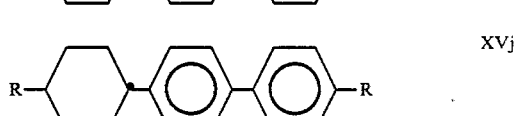
XVj

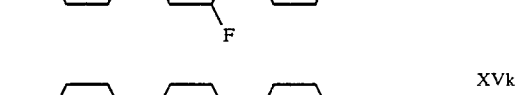
XVk

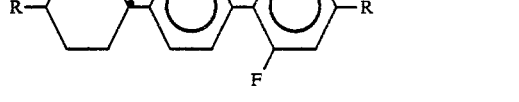
XVl

In these formulae the symbols R, which can in each case be identical or different, are preferably n-alkyl or n-alkoxy with in each case 2 to 7 C atoms. Compounds of the formulae XVb, XVd (especially those wherein the two symbols R are in each case n-alkyl or one R is n-alkyl and the other is n-alkoxy), XVg, XVi and XVl are particularly preferred.

In all the compounds from Groups A to E, R is preferably alkyl, —O-alkyl, —O—CO-alkyl, —COO-alkyl or oxaalkyl, wherein alkyl contains 1–12 C atoms, preferably 2–10 and in particular 3–9 C atoms.

$R^8$ in the compounds VII and VIII from Group C is alkyl, —O-alkyl or oxaalkyl, wherein alkyl contains 1–12 C atoms, preferably 2–10 and in particular 3–9 C atoms.

Compounds wherein the symbols R are alkyl, —O-alkyl and —O—CO-alkyl are particularly preferably used for the liquid crystal phases according to the invention.

Those compounds which contain two radicals R in which one radical R is alkyl and the other is alkyl, alkoxy or alkanoyloxy are furthermore particularly preferred.

If the alkyl groups contain 3 or more carbon atoms, these can be arranged in a straight or branched chain. However, generally, no components which contain more than one branched alkyl group are used in the phases according to the invention. Such branched alkyl groups contain no more than one chain branching in the context of the present invention; this branching is preferably a methyl or ethyl group in the 1- or 2-position of the carbon skeleton, so that particularly possible branched alkyl groups are: 2-methylpropyl, 2-methylbutyl, 1-methylpentyl, 2-methylpentyl and 1-methylhexyl. The liquid crystal dielectrics according to the invention as a rule contain only one component with a branched alkyl radical, in order to induce optical activity, if desired. No more than 10% by weight, preferably 0.5 to 3% by weight, of a component with a branched alkyl radical is usually added for this purpose. Those compounds of the formulae (I) to (XV) in which the alkyl radicals are straight-chain, that is to say are methyl, ethyl, n-propyl, n-butyl, n-pentyl, n-hexyl, n-heptyl, n-octyl, n-nonyl, n-decyl, n-undecyl and n-dodecyl, are otherwise preferably used as components of the phase according to the invention.

The phases according to the invention are prepared in a manner which is customary per se. As a rule, the desired amount of the components used in smaller quantity is dissolved in the components which make up the main constituent, advantageously at elevated temperature. If a temperature above the clear point of the main constituent is chosen here, it is particularly easy to observe completion of the dissolving operation.

However, it is also possible to mix solutions of the components in a suitable organic solvent, for example acetone, chloroform or methanol and, after thorough mixing, to remove the solvent again, for example by distillation under reduced pressure. In this procedure, it must of course be ensured that no impurities or undesirable doping substances are included through the solvent.

The liquid crystal phases according to the invention can be modified by suitable additives so that they can be used in all the types of liquid crystal display elements which have hitherto been disclosed.

Such additives are known to the expert and are described in detail in the literature. For example, it is possible to add conductive salts, preferably ethyldimethyl-dodecyl-ammonium 4-hexyloxybenzoate, tetrabutylammonium tetraphenylboranate or complex salts of crown ethers (cf., for example, B. I. Haller et al., Mol. Cryst.Liq.Cryst. volume 24, pages 249–258 (1973) to improve the conductivity, or substances for modifying the dielectric anisotropy, the viscosity and/or the orientation of the nematic phases. Substances of this type are described, for example, in German Offenlegungsschriften Nos. 2,209,127, 2,240,864, 2,321,632, 2,338,281, 2,450,088, 2,637,430, 2,853,728 and 2,902,177.

Throughout the foregoing, the "dot" on the right hand side of a ring represents the trans-configuration of the ring.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples and in the preceding text, all temperatures are set forth uncorrected in degrees Celsius and all parts and percentages are by weight, unless otherwise indicated.

In the examples, m.p. is the melting point and c.p. is the clear point of a liquid crystal substance.

In general, for phases having negative dielectric anisotropy, when compounds of the formula D are included, they are included in amounts of 10–30 wt%, preferably 15–25 wt%; when compounds of Group E are included, they are included generally in amounts of 8–25 wt%, preferably 12–16 wt%. As already noted, it is preferred that there be no compounds of Group B in phases of negative dielectric anisotropy; however, when these are included, they are included only in amounts up to 10 wt%. In phases having positive dielectric anisotropy, when compounds of Group A are included, they are included only in amounts of up to 10 wt%; when compounds of Group D are included, they are included in amounts of only up to 10 wt%; and when compounds of Group E are included, they are included in amounts of 10–60 wt%, preferably 25–55 wt%.

EXAMPLE 1

A liquid crystal phase consisting of 34.0% of r-1-cyano-cis-4-(trans-4-butylcyclohexyl)-1-heptylcyclohexane, 29.0% of r-1-cyano-cis-4-(trans-4-pentylcyclohexyl)-1-pentylcyclohexane, 10.8% of trans,trans-4-propyl-4'-methoxycyclohexylcyclohexane, 9.7% of trans,trans-4-propyl-4'-ethoxycyclohexylcyclohexane, 3.9% of trans-4-propylcyclohexyl trans,trans-4-butylcyclohexylcyclohexane-4'-carboxylate, 3.9% of trans-4-pentylcyclohexyl trans,trans-4-butylcyclohexylcyclohexane-4'-carboxylate, 4.8% of trans-4-propylcyclohexyl trans,trans-4-propylcyclohexylcyclohexane-4'-carboxylate and 3.9% of trans-4-pentylcyclohexyl trans,trans-4-propylcyclohexylcyclohexane-4'-carboxylate has a melting point of −10°, a clear point of 70° and an optical anisotropy of +0.03.

EXAMPLE 2

A liquid crystal phase consisting of 34.0% of r-1-cyano-cis-4-(trans-4-butylcyclohexyl)-1-heptylcyclohexane,
29.0% of r-1-cyano-cis-4-(trans-4-pentylcyclohexyl)-1-pentylcyclohexane,
10.8% of trans,trans-4-propyl-4'-methoxycyclohexylcyclohexane,
9.7% of trans,trans-4-propyl-4'-ethoxycyclohexylcyclohexane,
3.9% of trans-4-propylcyclohexyl trans,trans-4-butylcyclohexylcyclohexane-4'-carboxylate,
3.9% of trans-4-pentylcyclohexyl trans,trans-4-butylcyclohexylcyclohexane-4'-carboxylate,
4.8% of trans-4-propylcyclohexyl trans,trans-4-propylcyclohexylcyclohexane-4'-carboxylate, and
3.9% of r-1-cyano-cis-4-(trans-4-pentylcyclohexyl)-1-(trans-4-propylcyclohexyl)-cyclohexane
has a clear point of 72° and an optical anisotropy of +0.03.

EXAMPLE 3

A liquid crystal phase consisting of
34.0% of r-1-cyano-cis-4-(trans-4-butylcyclohexyl)-1-heptylcyclohexane,
29.0% of r-1-cyano-cis-4-(trans-4-pentylcyclohexyl)-1-pentylcyclohexane,
10.8% of trans,trans-4-propyl-4'-methoxycyclohexylcyclohexane,
9.7% of trans,trans-4-propyl-4'-ethoxycyclohexylcyclohexane,
4.8% of r-1-cyano-cis-4-(trans-4-propylcyclohexyl)-1-(trans-4-propylcyclohexyl)-cyclohexane,
3.9% of r-1-cyano-cis-4-(trans-4-pentylcyclohexyl)-1-(trans-4-propylcyclohexyl)-cyclohexane,
3.9% of r-1-cyano-cis-4-(trans-4-propylcyclohexyl)-1-(trans-4-butylcyclohexyl)-cyclohexane and
3.9% of r-1-cyano-cis-4-(trans-4-pentylcyclohexyl)-1-(trans-4-butylcyclohexyl)-cyclohexane
has a clear point of 75° and an optical anisotropy of +0.03.

EXAMPLE 4

A liquid crystal phase consisting of
34% of r-1-cyano-cis-4-(trans-4-butylcyclohexyl)-1-heptylcyclohexane,
29% of r-1-cyano-cis-4-(trans-4-pentylcyclohexyl)-1-pentylcyclohexane,
7% of trans,trans-4'-methoxycyclohexyl-4-propylcyclohexane,
5% of trans,trans-4'-ethoxycyclohexyl-4-propylcyclohexane,
5% of trans,trans-4'-propoxycyclohexyl-4-propylcyclohexane and
20% of 1-(trans-4-propylcyclohexyl)-2-(trans-4-propylcyclohexyl)-ethane,
has a melting point of −5.2°, a clear point of 60.3° and an optical anisotropy of +0.025.

EXAMPLE 5

A liquid crystal phase consisting of
19% of trans,trans-4-ethylcyclohexylcyclohexane-4'-carbonitrile,
19% of trans,trans-4-butylcyclohexylcyclohexane-4'-carbonitrile,
7% of trans,trans-4-propylcyclohexylcyclohexane-4'-carbonitrile,
12% of trans,trans-4'-propoxycyclohexyl-4-propylcyclohexane,
18% of trans,trans-4'-methoxycyclohexyl-4-propylcyclohexane,
20% of trans,trans-4'-propylcyclohexyl-4-butyryloxycyclohexane and
5% of trans,trans-4'-propylcyclohexyl-4-valeryloxycyclohexane
has a melting point of −11.4°, a clear point of 57.5°, and an optical anisotropy of +0.045.

EXAMPLE 6

A liquid crystal phase consisting of
19% of trans,trans-4-ethylcyclohexylcyclohexane-4'-carbonitrile,
19% of trans,trans-4-butylcyclohexylcyclohexane-4'-carbonitrile,
15% of trans,trans-4'-propoxycyclohexyl-4-propylcyclohexane,
5% of trans,trans-4'-methoxycyclohexyl-4-propylcyclohexane,
17% of trans,trans-4'-propylcyclohexyl-4-butyryloxycyclohexane,
20% of trans-4-propylcyclohexyl trans-4-pentylcyclohexanecarboxylate and
5% of 4-(trans-4-propylcyclohexyl)-4'-(trans-4-propylcyclohexyl)-biphenyl
has a melting point of −14.3°, a clear point of 69.1° and an optical anisotropy of +0.055.

EXAMPLE 7

A liquid crystal phase consisting of
13% of trans,trans-4-ethylcyclohexylcyclohexane-4'-carbonitrile,
13% of trans,trans-4-butylcyclohexylcyclohexane-4'-carbonitrile,
5% of trans,trans-4-pentylcyclohexylcyclohexane-4'-carbonitrile,
15% of 4-propylcyclohexyl trans-4-pentylcyclohexanecarboxylate,
13% of 4-(trans-4-pentylcyclohexyl)-4'-(trans-4-propylcyclohexyl)-biphenyl,
25% of trans,trans-4'-propoxycyclohexyl-4-propylcyclohexane,
7% of trans,trans-4'-methoxycyclohexyl-4-propylcyclohexane and
9% of trans,trans-4'-propylcyclohexyl-4-butyryloxycyclohexane
has a melting point of −10.4°, a clear point of 81° and an optical anisotropy of +0.065.

EXAMPLE 8

A liquid crystal phase consisting of
6% of 2-p-cyanophenyl-5-propyl-1,3-dioxane,
6% of 2-p-cyanophenyl-5-butyl-1,3-dioxane,
15% of p-trans-4-propylcyclohexyl-benzonitrile,
9% of trans-4-propylcyclohexyl trans-4-propylcyclohexanecarboxylate,
10% of trans-4-propylcyclohexyl trans-4-pentylcyclohexanecarboxylate,
9% of trans,trans-4'-propylcyclohexyl-4-butyryloxycyclohexane,
9% of trans,trans-4'-propylcyclohexyl-4-hexanoyloxycyclohexane,
6% of trans-4-propylcyclohexyl trans,trans-4-propylcyclohexyl-cyclohexane-4'-carboxylate,
6% of trans-4-pentylcyclohexyl trans,trans-4-propylcyclohexyl-cyclohexane-4'-carboxylate,
6% of trans-4-propylcyclohexyl trans,trans-4-butylcyclohexyl-cyclohexane-4'-carboxylate, 5% of trans-4-pentylcyclohexyl trans,trans-4-butylcyclohexyl-cyclohexane-4'-carboxylate,
5% of 4-(trans-4-propylcyclohexyl)-2'-fluoro-4'-(trans-4-propylcyclohexyl)-biphenyl,
4% of 4-(trans-4-pentylcyclohexyl)-2'-fluoro-4'-(trans-4-propylcyclohexyl)-biphenyl and
4% of 4-(trans-4-pentylcyclohexyl)-2'-fluoro-4'-(trans-4-pentylcyclohexyl)-biphenyl
has a melting point of $-16.5°$ and a clear point of $+96°$.

EXAMPLE 9

A liquid crystal phase consisting of
6% of 2-p-cyanophenyl-5-propyl-1,3-dioxane,
6% of 2-p-cyanophenyl-5-butyl-1,3-dioxane,
10% of p-trans-4-propylcyclohexyl-benzonitrile
9% of trans-4-propylcyclohexyl trans-4-propylcyclohexanecarboxylate,
10% of trans-4-propylcyclohexyl trans-4-pentylcyclohexanecarboxylate,
12% of trans,trans-4'-propylcyclohexyl-4-butyryloxycyclohexane,
11% of trans,trans-4'-propylcyclohexyl-4-hexanoyloxycyclohexane,
6% of trans-4-propylcyclohexyl trans,trans-4-propylcyclohexyl-cyclohexane-4'-carboxylate,
6% of trans-4-pentylcyclohexyl trans,trans-4-propylcyclohexyl-cyclohexane-4'-carboxylate,
6% of trans-4-propylcyclohexyl trans,trans-4-butylcyclohexyl-cyclohexane-4'-carboxylate,
5% of trans-4-pentylcyclohexyl trans,trans-4-butylcyclohexyl-cyclohexane-4'-carboxylate,
5% of 4-(trans-4-propylcyclohexyl)-2'-fluoro-4'-(trans-4-propylcyclohexyl)-biphenyl,
4% of 4-(trans-4-pentylcyclohexyl)-2'-fluoro-4'-(trans-4-propylcyclohexyl)-biphenyl and
4% of 4-(trans-4-pentylcyclohexyl)-2'-fluoro-4'-(trans-4-pentylcyclohexyl)-biphenyl
has a melting point of $-15.9°$ and a clear point of $+98°$.

EXAMPLE 10

A liquid crystal phase consisting of
6% of 2-p-cyanophenyl-5-propyl-1,3-dioxane,
6% of 2-p-cyanophenyl-5-butyl-1,3-dioxane,
15% of p-trans-4-propylcyclohexyl-benzonitrile,
19% of trans,trans-4'-propylcyclohexyl-4-butyryloxycyclohexane,
18% of trans,trans-4'-propylcyclohexyl-4-hexanoyloxycyclohexane,
6% of trans-4-propylcyclohexyl trans,trans-4-propylcyclohexyl-cyclohexane-4'-carboxylate,
6% of trans-4-pentylcyclohexyl trans,trans-4-propylcyclohexyl-cyclohexane-4'-carboxylate,
6% of trans-4-propylcyclohexyl trans,trans-4-butylcyclohexyl-cyclohexane-4'-carboxylate,
5% of trans-4-pentylcyclohexyl trans,trans-4-butylcyclohexyl-cyclohexane-4'-carboxylate,
5% of 4-(trans-4-propylcyclohexyl)-2'-fluoro-4'-(trans-4-propylcyclohexyl)-biphenyl,
4% of 4-(trans-4-pentylcyclohexyl)-2'-fluoro-4'-(trans-4-propylcyclohexyl)-biphenyl and
4% of 4-(trans-4-pentylcyclohexyl)-2'-fluoro-4'-(trans-4-pentylcyclohexyl)-biphenyl
has a melting point of $-7.6°$ and a clear point of $+102°$.

EXAMPLE 11

A liquid crystal phase consisting of
6% of 2-p-cyanophenyl-5-propyl-1,3-dioxane,
6% of 2-p-cyanophenyl-5-butyl-1,3-dioxane,
15% of p-trans-4-propylcyclohexyl-benzonitrile,
15% of trans,trans-4'-methoxycyclohexyl-4-propylcyclohexane,
9% of trans,trans-4'-propylcyclohexyl-4-butyryloxycyclohexane,
9% of trans,trans-4'-propylcyclohexyl-4-hexanoyloxycyclohexane,
6% of trans-4-propylcyclohexyl trans,trans-4-propylcyclohexyl-cyclohexane-4'-carboxylate,
6% of trans-4-pentylcyclohexyl trans,trans-4-propylcyclohexylcyclohexane-4'-carboxylate,
6% of trans-4-propylcyclohexyl trans,trans-4-butylcyclohexyl-cyclohexane-4'-carboxylate,
5% of trans-4-pentylcyclohexyl trans,trans-4-butylcyclohexyl-cyclohexane-4'-carboxylate,
5% of 4-(trans-4-propylcyclohexyl)-2'-fluoro-4'-(trans-4-propylcyclohexyl)-biphenyl,
5% of 4-(trans-4-pentylcyclohexyl)-2'-fluoro-4'-(trans-4-propylcyclohexyl)-biphenyl,
5% of 4-(trans-4-pentylcyclohexyl)-2'-fluoro-4'-(trans-4-pentylcyclohexyl)-biphenyl and
2% of 4-(trans-4-pentylcyclohexyl)-4'-(trans-4-propylcyclohexyl)-biphenyl
has a melting point of $-17.4°$ and a clear point of $+102°$.

EXAMPLE 12

A liquid crystal phase consisting of
6% of 2-p-cyanophenyl-5-propyl-1,3-dioxane,
6% of 2-p-cyanophenyl-5-butyl-1,3-dioxane,
10% of p-trans-4-propylcyclohexyl-benzonitrile,
17% of trans,trans-4'-methoxycyclohexyl-4-propylcyclohexane,
11% of trans,trans-4'-propylcyclohexyl-4-butyryloxycyclohexane,
10% of trans,trans-4'-propylcyclohexyl-4-hexanoyloxycyclohexane,
6% of trans-4-propylcyclohexyl trans,trans-4-propylcyclohexylcyclohexane-4'-carboxylate,
6% of trans-4-pentylcyclohexyl trans,trans-4-propylcyclohexylcyclohexane-4'-carboxylate,
6% of trans-4-propylcyclohexyl trans,trans-4-butylcyclohexyl-cyclohexane-4'-carboxylate,
5% of trans-4-pentylcyclohexyl trans,trans-4-butylcyclohexyl-cyclohexane-4'-carboxylate,
5% of 4-(trans-4-propylcyclohexyl)-2'-fluoro-4'-(trans-4-propylcyclohexyl)-biphenyl,
5% of 4-(trans-4-pentylcyclohexyl)-2'-fluoro-4'-(trans-4-propylcyclohexyl)-biphenyl,
5% of 4-(trans-4-pentylcyclohexyl)-2'-fluoro-4-(trans-4-pentylcyclohexyl)-biphenyl and
2% of 4-(trans-4-pentylcyclohexyl)-4'-(trans-4-propylcyclohexyl)-biphenyl
has a melting point of $-17.2°$ and a clear point of $+103°$.

EXAMPLE 13

A liquid crystal phase consisting of
34% of r-1-cyano-cis-4-(trans-4-butylcyclohexyl)-1-heptylcyclohexane,
29% of r-1-cyano-cis-4-(trans-4-pentylcyclohexyl)-1-pentylcyclohexane,
11% of trans,trans-4'-methoxycyclohexyl-4-propylcyclohexane,
10% of trans,trans-4'-ethoxycyclohexyl-4-propylcyclohexane,
4% of 1-(trans-4'-pentylcyclohexyl-4-cyclohexyl)-2-cyano-2-(trans-4-pentylcyclohexyl)-ethane, 4% of 1-(trans-4'-pentylcyclohexyl-4-cyclohexyl)-2-cyano-2-(trans-4-propylcyclohexyl)-ethane,
4% of trans-4-propylcyclohexyl trans,trans-4-propylcyclohexyl-cyclohexane-4'-carboxylate and
4% of trans-4-pentylcyclohexyl trans,trans-4-propylcyclohexyl-cyclohexane-4'-carboxylate
has a melting point of −8°, a clear point of +68° and an optical anisotropy of +0.028.

EXAMPLE 14

A liquid crystal phase consisting of
10% of trans-1-p-methoxyphenyl-4-propylcyclohexane,
10% of trans-1-p-ethoxyphenyl-4-propylcyclohexane,
33% of trans,trans-4'-methoxycyclohexyl-4-propylcyclohexane,
11% of r-1-cyano-cis-4-(trans-4-butylcyclohexyl)-1-heptylcyclohexane,
10% of r-1-cyano-cis-4-(trans-4-pentylcyclohexyl)-1-pentylcyclohexane,
5% of 4,4'-bis-(trans-4-propylcyclohexyl)-2-fluorobiphenyl,
5% of 4,4'-bis-(trans-4-pentylcyclohexyl)-2-fluorobiphenyl,
5% of 4-(trans-4-pentylcyclohexyl)-4'-(trans-4-propylcyclohexyl)-2-fluoro-biphenyl,
5% of 4,4'-bis-(trans-4-propylcyclohexyl)-biphenyl and
6% of 4-(trans-4-pentylcyclohexyl)-4'-(trans-4-propylcyclohexyl)-biphenyl
has a melting point of −19°, a clear point of 82°, an optical anisotropy of 0.074 and a dielectric anisotropy of −1.5.

EXAMPLE 15

A liquid crystal phase consisting of the following compounds is prepared:
6% of trans,trans-4-ethylcyclohexylcyclohexane-4'-carbonitrile,
6% of 2-p-cyanophenyl-5-butyl-1,3-dioxane,
3% of p-trans-4-propylcyclohexyl-benzonitrile,
17% of trans,trans-4'-methoxycyclohexyl-4-propylcyclohexane,
11% of trans,trans-4-methoxycyclohexyl-4-pentylcyclohexane,
10% of trans,trans-4-ethoxycyclohexyl-4-pentylcyclohexane,
10% of trans,trans-4-butoxycyclohexyl-4-propylcyclohexane,
8% of 4-(trans-4-propylcyclohexyl)-2'-fluoro-4'-(trans-4-propylcyclohexyl)-biphenyl,
7% of 4-(trans-4-pentylcyclohexyl)-4'-(trans-4-propylcyclohexyl)-biphenyl,
6% of trans-4-pentylcyclohexyl trans,trans-4-propylcyclohexylcyclohexane-4'-carboxylate,
6% of trans-4-propylcyclohexyl trans,trans-4-butylcyclohexylcyclohexane-4'-carboxylate,
5% of trans-4-propylcyclohexyl trans,trans-4-butylcyclohexylcyclohexane-4'-carboxylate and
5% of trans-4-pentylcyclohexyl trans,trans-4-butylcyclohexylcyclohexane-4'-carboxylate.

EXAMPLE 16

A liquid crystal phase consisting of
10% of p-trans-4-propylcyclohexylbenzonitrile,
6% of 2-p-cyanophenyl-5-propyl-1,3-dioxane,
6% of 2-p-cyanophenyl-5-butyl-1,3-dioxane,
32% of trans,trans-4'-methoxycyclohexyl-4-propylcyclohexane,
7% of trans,trans-4'-ethoxycyclohexyl-4-propylcyclohexane,
6% of trans-4-propylcyclohexyl trans,trans-4-propylcyclohexylcyclohexane-4'-carboxylate,
6% of trans-4-pentylcyclohexyl trans,trans-4-propylcyclohexylcyclohexane-4'-carboxylate,
6% of trans-4-propylcyclohexyl trans,trans-4-butylcyclohexylcyclohexane-4'-carboxylate,
6% of trans-4-pentylcyclohexyl trans,trans-4-butylcyclohexylcyclohexane-4'-carboxylate,
5% of 4,4'-bis-(trans-4-propylcyclohexyl)-2-fluorobiphenyl,
4% of 4,4'-bis-(trans-4-pentylcyclohexyl)-2-fluorobiphenyl and
6% of 4-(trans-4-pentylcyclohexyl)-4'-(trans-4-propylcyclohexyl)-2-fluoro-biphenyl
has a melting point of −13°, a clear point of 90°, an optical anisotropy of 0.077 and a viscosity of 19 (800; 3,050)×10$^{-3}$ Pa.s at 20° (−30°; −40°).

EXAMPLE 17

A liquid crystal phase consisting of
10% of p-trans-4-propylcyclohexylbenzonitrile,
6% of 2-p-cyanophenyl-5-propyl-1,3-dioxane,
6% of 2-p-cyanophenyl-5-butyl-1,3-dioxane,
11% of trans,trans-4'-methoxycyclohexyl-4-propylcyclohexane,
10% of trans,trans-4'-ethoxycyclohexyl-4-propylcyclohexane,
11% of trans,trans-4'-methoxycyclohexyl-4-butylcyclohexane,
11% of trans-1-p-ethoxyphenyl-4-propylcyclohexane,
4% of trans-4-propylcyclohexyl trans,trans-4-propylcyclohexylcyclohexane-4'-carboxylate,
4% of trans-4-pentylcyclohexyl trans,trans-4-propylcyclohexylcyclohexane-4'-carboxylate,
4% of trans-4-propylcyclohexyl trans,trans-4-butylcyclohexylcyclohexane-4'-carboxylate,
4% of trans-4-pentylcyclohexyl trans,trans-4-butylcyclohexylcyclohexane-4'-carboxylate,
4% of 4,4'-bis-(trans-4-propylcyclohexyl)-2-fluorobiphenyl,
4% of 4,4'-bis-(trans-4-pentylcyclohexyl)-2-fluorobiphenyl,
4% of 4-(trans-4-pentylcyclohexyl)-4'-(trans-4-propylcyclohexyl)-2-fluoro-biphenyl,
3% of 4,4'-bis-(trans-4-propylcyclohexyl)-biphenyl and
4% of 4-(trans-4-pentylcyclohexyl)-4'-(trans-4-propylcyclohexyl)-biphenyl
has a melting point of −6°, a clear point of 90°, an optical anisotropy of 0.084 and a viscosity of 18 (780; 2,900)×10$^{-3}$ Pa.s at 20° (−30°; −40°).

EXAMPLE 18

A liquid crystal phase consisting of
10% of p-trans-4-propylcyclohexylbenzonitrile,
6% of 2-p-cyanophenyl-5-propyl-1,3-dioxane,
6% of 2-p-cyanophenyl-5-butyl-1,3-dioxane,
32% of trans,trans-4'-methoxycyclohexyl-4-propylcyclohexane,
7% of trans-1-p-ethoxyphenyl-4-propylcyclohexane,
6% of trans-4-propylcyclohexyl trans,trans-4-propylcyclohexylcyclohexane-4'-carboxylate,
5% of trans-4-pentylcyclohexyl trans,trans-4-propylcyclohexylcyclohexane-4'-carboxylate,
6% of trans-4-propylcyclohexyl trans,trans-4-butylcyclohexylcyclohexane-4'-carboxylate, 6% of trans-4-pentylcyclohexyl trans,trans-4-butylcyclohexylcyclohexane-4'-carboxylate,
5% of 4,4'-bis-(trans-4-propylcyclohexyl)-2-fluorobiphenyl,
6% of 4-(trans-4-pentylcyclohexyl)-4'-(trans-4-propylcyclohexyl)-2-fluorobiphenyl and
5% of 4-(trans-4-pentylcyclohexyl)-4'-(trans-4-propylcyclohexyl)-biphenyl has a melting point of −20°, a clear point of 90°, an optical anisotropy of 0.082 and a viscosity of 19.6 (283; 842)×10$^{-3}$ Pa.s at 20° (−20°; −30°).

EXAMPLE 19

A liquid crystal phase consisting of
10% of p-trans-4-propylcyclohexylbenzonitrile,
6% of 2-p-cyanophenyl-5-propyl-1,3-dioxane,
6% of 2-p-cyanophenyl-5-butyl-1,3-dioxane,
32% of trans,trans-4'-methoxycyclohexyl-4-propylcyclohexane,
7% of trans-1-p-ethoxyphenyl-4-propylcyclohexane,
6% of trans-4-propylcyclohexyl trans,trans-4-propylcyclohexylcyclohexane-4'-carboxylate,
6% of trans-4-pentylcyclohexyl trans,trans-4-propylcyclohexylcyclohexane-4'-carboxylate,
6% of trans-4-propylcyclohexyl trans,trans-4-butylcyclohexylcyclohexane-4'-carboxylate,
6% of trans-4-pentylcyclohexyl trans,trans-4-butylcyclohexylcyclohexane-4'-carboxylate,
5% of 4,4'-bis-(trans-4-propylcyclohexyl)-2-fluorobiphenyl,
6% of 4-(trans-4-pentylcyclohexyl)-4'-trans-4-propylcyclohexyl)-2-fluorobiphenyl and
4% of 4-(trans-4-pentylcyclohexyl)-4'-(trans-4-propylcyclohexyl)-biphenyl has a melting point of −20°, a clear point of 80°, an optical anisotropy of 0.082 and a viscosity of 20×10$^{-3}$ Pa.s at 20°.

EXAMPLE 20

A liquid crystal phase consisting of
10% of p-trans-4-propylcyclohexylbenzonitrile,
6% of 2-p-cyanophenyl-5-propyl-1,3-dioxane,
6% of 2-p-cyanophenyl-5-butyl-1,3-dioxane,
20% of trans,trans-4'-methoxycyclohexyl-4-propylcyclohexane,
6% of trans,trans-4'-ethoxycyclohexyl-4-propylcyclohexane,
7% of trans,trans-4'-methoxycyclohexyl-4-butylcyclohexane,
5% of trans-1-p-ethoxyphenyl-4-propylcyclohexane,
6% of trans-4-propylcyclohexyl trans,trans-4-propylcyclohexylcyclohexane-4'-carboxylate,
6% of trans-4-pentylcyclohexyl trans,trans-4-propylcyclohexylcyclohexane-4'-carboxylate,
6% of trans-4-propylcyclohexyl trans,trans-4-butylcyclohexylcyclohexane-4'-carboxylate,
6% of trans-4-pentylcyclohexyl trans,trans-4-butylcyclohexylcyclohexane-4'-carboxylate,
5% of 4,4'-bis-(trans-4-propylcyclohexyl)-2-fluorobiphenyl,
6% of 4,4'-bis-(trans-4-pentylcyclohexyl)-2-fluorobiphenyl and
5% of 4-(trans-4-pentylcyclohexyl)-4'-(trans-4-propylcyclohexyl)-2-fluoro-biphenyl has a melting point of −16°, a clear point of 93°, an optical anisotropy of 0.079 and a viscosity of 22 (970; 4,000)×10$^{-3}$ Pa.s at 20° C. (−30°; −40°).

EXAMPLE 21

A liquid crystal phase consisting of
10% of p-trans-4-propylcyclohexylbenzonitrile,
6% of 2-p-cyanophenyl-5-propyl-1,3-dioxane,
6% of 2-p-cyanophenyl-5-butyl-1,3-dioxane,
7% of trans,trans-4'-methoxycyclohexyl-4-propylcyclohexane,
7% of trans,trans-4'-ethoxycyclohexyl-4-propylcyclohexane,
7% of trans,trans-4'-methoxycyclohexyl-4-butylcyclohexane,
17% of trans-1-p-ethoxyphenyl-4-propylcyclohexane,
6% of trans-4-propylcyclohexyl trans,trans-4-propylcyclohexylcyclohexane-4'-carboxylate,
6% of trans-4-pentylcyclohexyl trans,trans-4-propylcyclohexylcyclohexane-4'-carboxylate,
6% of trans-4-propylcyclohexyl trans,trans-4-butylcyclohexylcyclohexane-4'-carboxylate,
6% of trans-4-pentylcyclohexyl trans,trans-4-butylcyclohexylcyclohexane-4'-carboxylate,
5% of 4,4'-bis-(trans-4-propylcyclohexyl)-2-fluorobiphenyl,
6% of 4,4'-bis-(trans-4-pentylcyclohexyl)-2-fluorobiphenyl and
5% of 4-(trans-4-pentylcyclohexyl)-4'-(trans-4-propylcyclohexyl)-2-fluoro-biphenyl has a melting point of −13°, a clear point of 95°, an optical anisotropy of 0.084 and a viscosity of 21 (900; 3,800)×10$^{-3}$ Pa.s at 20° (−30°; −40°).

EXAMPLE 22

1.0% of azo dyestuff (λmax=460 nm, formula VI', $R_1$=2-nonylmercapto-1,3,4-thiadiazol-5-yl, $R_2$=p-(4-butylcyclohexyl)-benzyl, n=1, $Ph_2$=1,4-naphthylene and $Ph_3$=2,5-tolylene) and 1.3% of azo dyestuff (λmax=615 nm, formula V', $R_1-Ph_1$=3-octylmercapto-1,2,4-thiadiazol-5-yl, $R_2$=p-(4-butylcyclohexyl)-benzylamino, n=1, $Ph_2$=2,5-xylylene and $Ph_3$=1,4-naphthylene) were dissolved in a liquid crystal phase consisting of
21% of r-1-cyano-cis-4-(trans-4-butylcyclohexyl)-1-heptylcyclohexane,
22% of r-1-cyano-cis-4-(trans-4-pentylcyclohexyl)-1-pentylcyclohexane,
12% of trans,trans-4-propyl-4'-methoxycyclohexylcyclohexane,
9% of trans,trans-4-propyl-4'-ethoxycyclohexylcyclohexane,
4% of trans-4-propylcyclohexyl trans,trans-4-propylcyclohexylchlorohexane-4'-carboxylate,
4% of trans-4-pentylcyclohexyl trans,trans-4-propylcyclohexylcyclohexane-4'-carboxylate,
4% of trans-4-propylcyclohexyl trans,trans-4-butylcyclohexylcyclohexane-4'-carboxylate,
4% of trans-4-pentylcyclohexyl trans,trans-4-butylcyclohexylcyclohexane-4'-carboxylate and
20% of r-1-cyano-cis-4-(trans-4-pentylcyclohexyl)-1-(trans-4-propylcyclohexyl)-cyclohexane
(c.p. 100° C.).

In an electrooptical display element at a layer thickness of 1 μm, this guest-host system exhibits a color interval ΔE up to the point of achromatism of 0.3 in artificial light (CIU-A) and a color interval ΔE of 1.0 in daylight (CIU-D 65).

EXAMPLE 23

0.12% of azo dyestuff ($\lambda$max=430 nm, formula V', $R_1=R_2=$p-(4-propylcyclohexyl)-benzyloxy and n=2), 0.88% of azo dyestuff ($\lambda$max=460 nm, formula VI', $R_1=$2-nonylmercapto-1,3,4-thiadiazol-5-yl, $R_2=$p-(4-butylcyclohexyl)-benzyl, n=1, $Ph_2=$1,4-naphthylene and $Ph_3=$2,5-tolylene) and 1.30% of azo dyestuff ($\lambda$max=615 nm, formula V', $R_1-Ph_1=$3-octylmercapto-1,2,4-thiadiazol-5-yl, $R_2=$p-(4-butylcyclohexyl)-benzylamino, n=1, $Ph_2=$2,5-xylylene and Ph3=1,4-naphthylene) were dissolved in a liquid crystal phase consisting of 34% of r-1-cyano-cis-4-(trans-4-butylcyclohexyl)-1-heptylcyclohexane, 30% of r-1-cyano-cis-4-(trans-4-pentylcyclohexyl)-1-pentylcyclohexane, 11% of trans,trans-4-propyl-4'-methoxycyclohexylcyclohexane, 9% of trans,trans-4-propyl-4'-propoxycyclohexylcyclohexane, 4% of trans-4-propylcyclohexyl trans,trans-4-butylcyclohexylcyclohexane-4'-carboxylate, 4% of trans-4-pentylcyclohexyl trans,trans-4-butylcyclohexylcyclohexane-4'-carboxylate, 4% of trans-4-propylcyclohexyl trans,trans-4-propylcyclohexylcyclohexane-4'-carboxylate and 4% of trans-4-pentylcyclohexyl trans,trans-4-propylcyclohexylcyclohexane-4'-carboxylate (c.p. 72°).

In an electrooptical display element at a layer thickness of 5 $\mu$m, this guest-host system exhibits a color interval $\Delta$E up to the point of achromatism of 0.62 (0.81) in artificial light (CIU-A) and a color interval $\Delta$E of 0.22 (0.43) in daylight (CIU-D 65).

EXAMPLE 24

0.45% of azo dyestuff ($\lambda$max=393 nm, formula VI', $R_1=C_4H_9$, $R_2=C_3H_7$ and n=1), 1.55% of azo dyestuff ($\lambda$max=460 nm, formula VI', $R_1=$2-nonylmercapto-1,3,4-thiadiazol-5-yl, $R_2=$p-(4-butylcyclohexyl)-benzyl, n=1, $Ph_2=$1,4-naphthylene, and $Ph_3=$2,5-tolylene), and 2.22% of azo dyestuff ($\lambda$max=615 nm, formula V', $R_1-Ph_1=$3-octylmercapto-1,2,4-thiadiazol-5-yl, $R_2=$p-(4-butylcyclohexyl)-benzylamino, n=1, $Ph_2=$2,5-xylylene and $Ph_3=$1,4-naphthylene) were dissolved in the liquid crystal phase from Example 22 (c.p. 101°).

In an electrooptical display element at a layer thickness of 4 $\mu$m (10 $\mu$m), this guest-host system exhibits a color interval $\Delta$E up to the point of achromatism of 0.99 (0.81) in artificial light (CIU-A) and a color interval $\Delta$E of 2.27 (0.38) in daylight (CIU-D 65).

EXAMPLE 25

0.39% of azo dyestuff G 232 ($\lambda$max=443 nm, formula V', $R_1=R_2=$NHC$_4$H$_9$, n=2 and $Ph_3=$1,4-naphthylene), 0.50% of azo dyestuff G 241 ($\lambda$max=558 nm, formula V', $R_1=C_4H_9$, $R_2=N(C_2H_5)_2$, n=2 and $Ph_3=$1,4-naphthylene), and 1.30% of a mixture of naphthoquinone dyestuffs of the formula IV' (obtainable by reacting 4,8-diamino-1,5-naphthoquinone with equimolar amounts of 4-n-butoxyaniline, 4-n-pentoxyaniline and 4-n-hexyloxyaniline and 4-n-heptyloxyaniline, $\lambda$max=685 nm) are dissolved in the liquid crystal phase from Example 22 (c.p. 99°).

In an electrooptical display element at a layer thickness of 1 $\mu$m (2 $\mu$m), this guest-host system exhibits a color interval $\Delta$E up to the point of achromatism of 0.40 (0.79) in artificial light (CIU-A) and a color interval $\Delta$E of 0.54 (0.96) in daylight (CIU-D 65).

EXAMPLE 26

0.29% of azo dyestuff G 232 ($\lambda$max=443 nm, formula V', $R_1=R_2=$—NHC$_4$H$_9$, n=2 and $Ph_3=$1,4-naphthylene), 0.09% of azo dyestuff G 239 ($\lambda$max=512 nm, formula V', $R_1=C_4H_9$, $R_2=N(CH_3)_2$, n=1 and $Ph_2=$1,4-naphthylene), 0.33% of azo dyestuff G 241 ($\lambda$max=558 nm, formula V', $R_1=C_4H_9$, $R_2=N(C_2H_5)_2$, n=2 and $Ph_3=$1,4-naphthylene), and 1.32% of a mixture of naphthoquinone dyestuffs of the formula IV' (obtainable by reacting 4,8-diamino-1,4-naphthoquinone with equimolar amounts of 4-n-butoxyaniline, 4-n-pentoxyaniline, 4-n-hexyloxyaniline and 4-n-heptyloxyaniline, $\lambda$max=685 nm) are dissolved in the liquid crystal phase from Example 23 (c.p. 70°).

In an electrooptical display element at a layer thickness of 2 $\mu$m (7 $\mu$m), this guest-host system exhibits a color interval $\Delta$E up to the point of achromatism of 0.13 (0.32) in artificial light (CIU-A) and a color interval $\Delta$E of 0.27 (0.57) in daylight (CIU-D 65).

EXAMPLE 27

0.20% of azo dyestuff ($\lambda$max=430 nm, formula V', $R_1=R_2=$p-(4-propylcyclohexyl)-benzyloxy and n=2), 0.50% of azo dyestuff ($\lambda$max=460 nm, formula VI', $R_1=$2-nonylmercapto-1,3,4-thiadiazol-5-yl, $R_2=$p-(4-butylcyclohexyl)-benzyl, n=1, $Ph_2=$1,4-naphthylene and $Ph_3=$2,5-tolylene), 0.36% of azo dyestuff ($\lambda$max=548 nm, formula V', $R_1=$2-nonylmercapto-1,3,4-thiadiazol-5-yl, $R_2=$butyl-methylamino, n=1, and $Ph_2=$1,4-naphthylene) 0.70% of anthraquinone dyestuff ($\lambda$max=638 nm, formula III', $R_2=R_3=R_4=Z=Y=H$, $W=X=NH_2$, and $R_1=$2-[p-(4-butylcyclohexyl)-benzylmercapto-1,3,4-oxadiazol-5-yl], and 1.10% of a mixture of naphthoquinone dyestuffs of the formula IV' (obtainable by reacting 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda$max=685 nm) are dissolved in the liquid crystal phase from Example 23 (c.p. 71°).

In an electrooptical display element at a layer thickness of 2 $\mu$m (9 $\mu$m) this guest-host system exhibits a color interval $\Delta$E up to the point of achromatism of 0.18 (0.57) in artificial light (CIU-A) and a color interval of 0.19 (0.01) in daylight (CIU-D 65).

EXAMPLE 28

0.85% of azo dyestuff ($\lambda$max=460 nm, formula VI', $R_1=$2-nonylmercapto-1,3,4-thiadiazol-5-yl, $R_2=$p-(4-butylcyclohexyl)-benzyl, n=1, $Ph_2=$1,4-naphthylene and Ph=2,5-tolylene), 0.90% of azo dyestuff ($\lambda$max=615 nm, formula V', $R_1$-$Ph_1=$3-octylmercapto-1,2,4-thiadiazol-5-yl, $R_2=$p-(4-butylcyclohexyl)-benzyl-amino, n=1, $Ph_2=$2,5-xylylene and $Ph_3=$1,4-naphthylene), 0.20% of azo dyestuff ($\lambda$max=430 nm, formula V', $R_1=R_2=$p-(4-propylcyclohexyl)-benzyloxy and n=2), 0.28% of azo dyestuff ($\lambda$max=548 nm, formula V', $R_1=$2-nonylmercapto-1,3,4-thiadiazol-5-yl, $R_2=$butyl-methylamino, n=1 and $Ph_2=$1,4-naphthylene), and 1.10% of a mixture of naphthoquinone dyestuffs of the formula IV' (obtainable by reacting 4,8-diamino-1,5-naphthoquinone with equimolar amounts of 4-n-butoxyaniline, 4-n-pentoxyaniline, 4-n-hexyloxyaniline and 4-n-heptyloxyaniline, $\lambda$max=685 nm) are dissolved in the liquid crystal phase from Example 22 (c.p. 101°).

In an electrooptical display element at a layer thickness of 2 μm (10 μm), this guest-host system exhibits a color interval ΔE up to the point of achromatism of 0.64 (0.33) in artificial light (CIU-A) and a color interval ΔE of 0.35 (0.29) in daylight (CIU-D 65).

The guest-host systems described in Examples 22 to 28 are very stable and are outstandingly suitable for positive representation and exhibit steep characteristic transmission lines. The corresponding electrooptical display elements which can be used can have a simple cell technology, that is to say no polarizer and no pretilt are necessary.

Unless otherwise indicated, Ph in the azo dyestuffs of the formulae V' and VI' in Examples 22 to 28 is in each case 1,4-phenylene.

EXAMPLE 29

A liquid crystal phase consisting of
8% of 2-(trans-4-cyanocyclohexyl)-5-propyl-1,3-dioxane,
10% of 2-(trans-4-cyanocyclohexyl)-5-butyl-1,3-dioxane,
8% of 2-(trans-4-cyanocyclohexyl)-5-pentyl-1,3-dioxane,
10% of p-trans-4-propylcyclohexyl-benzonitrile,
8% of trans,trans-4'-methoxycyclohexyl-4-propylcyclohexane,
5% of trans,trans-4'-ethoxycyclohexyl-4-propylcyclohexane,
13% of trans,trans-4'-methoxycyclohexyl-4-butylcyclohexane,
11% of trans,trans-4'-methoxycyclohexyl-4-pentylcyclohexane,
6% of trans,trans-4'-ethoxycyclohexyl-4-pentylcyclohexane,
7% of 4-(trans-4-pentylcyclohexyl)-4'-(trans-4-propylcyclohexyl)-2-fluorobiphenyl,
7% of 4,4'-bis-(trans-4-propylcyclohexyl)-2-fluorobiphenyl and
7% of 4,4'-bis-(trans-4-pentylcyclohexyl)-2-fluorobiphenyl
has a melting point of −14°, a clear point of 72°, a viscosity of $23\times10^{-3}$ Pa.s at 20°, an optical anisotropy of 0.08 and threshold voltage of 1.8 volts. This phase is distinguished by a positive dielectric anisotropy and a low optical anisotropy.

EXAMPLE 30

A liquid crystal phase consisting of
20% of r-1-cyano-cis-4-(trans-4-butylcyclohexyl)-1-heptylcyclohexane,
20% of r-1-cyano-cis-4-(trans-4-pentylcyclohexyl)-1-pentylcyclohexane,
12% of trans,trans-4'-methoxycyclohexyl-4-butylcyclohexane,
10% of trans,trans-4'-methoxycyclohexyl-4-pentylcyclohexane,
8% of trans,trans-4'-ethoxycyclohexyl-4-pentylcyclohexane,
11% of 1-(trans-4-propylcyclohexyl)-2-(trans,trans-4'-propylbicyclohex-4-yl)-ethane,
11% of 1-(trans-4-pentylcyclohexyl)-2-(trans,trans-4'-pentylbicyclohex-4-yl)-ethane and
8% of 4,4'-bis-(trans-4-propylcyclohexyl)-2-fluorobiphenyl
has a melting point of −10°, a clear point of 85°, a viscosity of $32\times10^{-3}$ Pa.s at 20°, an optical anisotropy of 0.045 and a dielectric anisotropy of −3.2. This phase is distinguished by a negative dielectric anisotropy and a very low optical anisotropy.

EXAMPLE 31

A liquid crystal phase consisting of
6% of 2-p-cyanophenyl-5-propyl-1,3-dioxane,
6% of 2-p-cyanophenyl-5-butyl-1,3-dioxane,
10% of p-trans-4-propylcyclohexyl-benzonitrile,
6% of trans,trans-4'-ethoxycyclohexyl-4-propylcyclohexane,
18% of trans,trans-4'-methoxycyclohexyl-4-pentylcyclohexane,
12% of trans,trans-4'-ethoxycyclohexyl-4-pentylcyclohexane,
12% of trans,trans-4'-butyryloxycyclohexyl-4-propylcyclohexane,
3% of trans-4-propylcyclohexyl trans,trans-4-propylcyclohexylcyclohexane-4'-carboxylate,
3% of trans-4-pentylcyclohexyl trans,trans-4-propylcyclohexylcyclohexane-4'-carboxylate,
3% of trans-4-propylcyclohexyl trans,trans-4-butylcyclohexylcyclohexane-4'-carboxylate,
3% of trans-4-pentylcyclohexyl trans,trans-4-butylcyclohexylcyclohexane-4'-carboxylate,
3% of 1-(trans-4-propylcyclohexyl-2-(trans,trans-4'-propylbicyclohex-4-yl)-ethane,
4% of 1-(trans-4-pentylcyclohexyl-2-(trans,trans-4'-pentylbicyclohex-4-yl)-ethane,
3% of 4,4'-bis-(trans-4-propylcyclohexyl)-2-fluorobiphenyl,
4% of 4,4'-bis-(trans-4-pentylcyclohexyl)-2-fluorobiphenyl and
4% of 4-(trans-4-pentylcyclohexyl)-4'-(trans-4-propylcyclohexyl)-2-fluorobiphenyl
has a melting point of −17°, a clear point of 85°, no smectic/nematic phase transition up to −40°, a viscosity of $19\times10^{-3}$ ($780\times10^{-3}$) Pa.s at 20° (−30°), an optical anisotropy of 0.084 and a threshold voltage of 2.7 volts. This phase is distinguished by a positive dielectric anisotropy, a high clear point and a wide nematic range.

EXAMPLE 32

A liquid crystal phase consisting of
11% of p-trans-4-propylcyclohexyl-benzonitrile,
10% of p-trans-4-butylcyclohexyl-benzonitrile,
18% of 2-(trans-4-pentylcyclohexyl)-5-ethyl-1,3-dioxane,
15% of 2-(trans-4-ethoxycyclohexyl)-5-propyl-1,3-dioxane,
5% of p-(trans,trans-4-propylcyclohexylcyclohex-4'-yl)benzonitrile,
4% of 4-cyano-4'-(trans-4-pentylcyclohexyl)-biphenyl,
25% of trans-4-propylcyclohexyl trans-4-propylcyclohexanecarboxylate,
6% of trans-4-propylcyclohexyl trans,trans-4-propylcyclohexylcyclohexane-4'-carboxylate and
6% of 4,4'-bis-(trans-4-propylcyclohexyl)-2-fluorobiphenyl
has a melting point of −16°, a clear point of 61°, a viscosity of $17\times10^{-3}$ Pa.s at 20°, an optical anisotropy of 0.09 and a threshold voltage of 2.7 volts. This phase is distinguished by a positive dielectric anisotropy, a low optical anisotropy, a particularly low viscosity and a good steepness of the characteristic electrooptical lines.

EXAMPLE 33

A liquid crystal phase consisting of
8% of 2-p-cyanophenyl-5-propyl-1,3-dioxane,
7% of 2-p-cyanophenyl-5-butyl-1,3-dioxane,
7% of 2-p-cyanophenyl-5-pentyl-1,3-dioxane,
6% of trans,trans-4'-ethoxycyclohexyl-4-propylcyclohexane,
9% of trans,trans-4'-methoxycyclohexyl-4-butylcyclohexane,
14% of trans,trans-4'-methoxycyclohexyl-4-pentylcyclohexane,
10% of trans,trans-4'-ethoxycyclohexyl-4-pentylcyclohexane,
12% of trans,trans-4'-butyryloxycyclohexyl-4-propylcyclohexane,
3% of trans,trans,trans-4-propylcyclohexylcyclohexylcyclohexane-4''-carbonitrile,
3% of trans,trans,trans-4-butylcyclohexylcyclohexylcyclohexane-4'''-carbonitrile,
3% of trans,trans,trans-4-pentylcyclohexylcyclohexylcyclohexane-4''-carbonitrile,
3% of p-(trans,trans-4-propylcyclohexylcyclohex-4'-yl)benzonitrile,
3% of 4,4'-bis-(trans-4-propylcyclohexyl)-2-fluorobiphenyl,
4% of 4,4'-bis-(trans-4-pentylcyclohexyl)-2-fluorobiphenyl,
4% of 4-(trans-4-pentylcyclohexyl)-4'-(trans-4-propylcyclohexyl)-2-fluorobiphenyl and
4% of 4,4'-bis-(trans-4-propylcyclohexyl)-biphenyl
has a melting point of $-16°$, a clear point of $39°$, a viscosity of $24 \times 10^{-3}$ ($850 \times 10^{-3}$) Pa.s at $20°$ ($-30°$), an optical anisotropy of 0.082 and a threshold voltage of 2.5 volts. This phase is distinguished by a low viscosity, a low optical anisotropy and a wide nematic range.

EXAMPLE 34

A liquid crystal phase consisting of
16% of p-trans-4-propylcyclohexylbenzonitrile,
9% of p-trans-4-butylcyclohexylbenzonitrile,
12% of trans,trans-4'-propoxycyclohexyl-4-propylcyclohexane,
12% of trans,trans-4'-methoxycyclohexyl-4-pentylcyclohexane,
12% of trans,trans-4'-ethoxycyclohexyl-4-pentylcyclohexane,
9% of trans,trans-4'-propylcyclohexyl-4-butyryloxycyclohexane,
12% of 1-(trans-4-propylcyclohexyl)-2-[trans-4-(trans-4-pentylcyclohexyl)-cyclohexyl]-ethane,
3% of 4,4'-bis-(trans-4-propylcyclohexyl)-2-fluorbiphenyl,
3% of 4,4'-bis-(trans-4-pentylcyclohexyl)-2-fluorbiphenyl,
5% of 4-(trans-4-pentylcyclohexyl)-4'-(trans-4-propylcyclohexyl)-2-fluorbiphenyl,
3% of 4,4'-bis-(trans-4-propylcyclohexyl)-biphenyl and
4% of 4-(trans-4-pentylcyclohexyl)-4'-(trans-4-propylcyclohexyl)-biphenyl
has a clear point of $95°$, a viscosity of $20 \cdot 10^{-3}$ Pa.s at $20°$, an optical anisotropy of 0.084 and a threshold voltage of 2.5 Volts.

EXAMPLE 35

A liquid crystal phase consisting of
12% of trans,trans-4'-propoxycyclohexyl-4-propylcyclohexane,
12% of trans,trans-4'-methoxycyclohexyl-4-pentylcyclohexane,
12% of trans,trans-4'-ethoxycyclohexyl-4-pentylcyclohexane,
9% of trans,trans-4'-propylcyclohexyl-4-butyryloxycyclohexane,
3% of trans,trans-4-propylcyclohexylcyclohexane-4'-carboxylic acid-trans-4-propylcyclohexylester,
3% of trans,trans-4-propylcyclohexylcyclohexane-4'-carboxylic acid-trans-4-pentylcyclohexylester,
3% of trans,trans-4-butylcyclohexylcyclohexane-4'-carboxylic acid-trans-4-propylcyclohexylester,
3% of trans,trans-4-butylcyclohexylcyclohexane-4'-carboxylic acid-trans-pentylcyclohexylester,
3% of 4,4'-bis-(trans-4-propylcyclohexyl)-2-fluorbiphenyl,
3% of 4,4'-bis-(trans-4-pentylcyclohexyl)-2-fluorbiphenyl,
3% of 4,4'-bis-(trans-4-propylcyclohexyl)-biphenyl,
4% of 4-(trans-4-pentylcyclohexyl)-4'-(trans-4-propylcyclohexyl)-biphenyl,
5% of 4-(trans-4-pentylcyclohexyl)-4'-(trans-4-propylcyclohexyl)-2-fluorbiphenyl,
16% of p-trans-4-propylcyclohexylbenzonitrile and
9% of p-trans-4-butylcyclohexylbenzonitrile
has a melting point of $-16°$, a clear point of $95°$, no smectic/nematic phase transition up to $-40°$, a viscosity of 20 (300; 3100)$\times 10^{-3}$ Pa.s at $20°$ ($-20°$; $-40°$), a dielectric anisotropy of $+4.6$, an optical anisotropy of 0.0868 and a threshold voltage of 2.5 Volts.

EXAMPLE 36

A liquid crystal phase consisting of
12% of trans,trans-4'-propoxycyclohexyl-4-propylcyclohexane,
16% of trans,trans-4'-methoxycyclohexyl-4-pentylcyclohexane,
10% of trans,trans-4'-ethoxycyclohexyl-4-pentylcyclohexane,
10% of trans,trans-4'-propylcyclohexyl-4-butyryloxycyclohexane,
3% of trans,trans-4-propylcyclohexylcyclohexane-4'-carboxylic acid-trans-4-propylcyclohexylester,
3% of trans,trans-4-propylcyclohexylcyclohexane-4'-carboxylic acid-trans-4-pentylcyclohexylester,
3% of trans,trans-4-butylcyclohexylcyclohexane-4'-carboxylic acid-trans-4-propylcyclohexylester,
3% of trans,trans-4-butylcyclohexylcyclohexane-4'-carboxylic acid-trans-pentylcyclohexylester,
3% of 4,4-bis-(trans-4-propylcyclohexyl)-2-fluorbiphenyl,
3% of 4,4'-bis-(trans-4-pentylcyclohexyl)-2-fluorbiphenyl,
3% of 4,4'-bis-(trans-4-propylcyclohexyl)-biphenyl,
5% of 4-(trans-4-pentylcyclohexyl)-4'-(trans-4-propylcyclohexyl)-biphenyl,
4% of 4-(trans-4-pentylcyclohexyl)-4'-(trans-4-propylcyclohexyl)-2-fluorbiphenyl,
15% of p-trans-4-propylcyclohexylbenzonitrile and
7% trans-1-p-ethoxyphenyl-4-propylcyclohexane
has a melting point of $-18°$, a clear point of $95°$, no smectic/nematic phase transition up to $-40°$, a viscosity of 19 (235; 2270)$\times 10^{-3}$ Pa.s at $20°$ ($=20°$; $-40°$), a dielectric anisotropy of $+2.8$, an optical anisotropy of 0.0830 and a threshold voltage of 3.1 Volts.

EXAMPLE 37

A liquid crystal phase consisting of the following compounds is prepared:
20% of r-1-cyano-cis-4-(trans-4-butylcyclohexyl)-1-heptylcyclohexane,
21% of r-1-cyano-cis-4-(trans-4-pentylcyclohexyl)-1-pentylcyclohexane,
11% of trans,trans-4'-methoxycyclohexyl-4-propylcyclohexane,
10% of trans,trans-4'-ethoxycyclohexyl-4-propylcyclohexane,
4% of trans,trans-4-propylcyclohexylcyclohexane-4'-carboxylic acid-trans-4-propylcyclohexylester,
4% of trans,trans-4-propylcyclohexylcyclohexane-4'-carboxylic acid-trans-4-pentylcyclohexylester,
4% of trans,trans-4-butylcyclohexylcyclohexane-4'-carboxylic acid-trans-4-propylcyclohexylester,
4% of trans,trans-4-butylcyclohexylcyclohexane-4'-carboxylic acid-trans-4-pentylcyclohexylester and
22% of r-1-cyano-1-propyl-cis-4-[trans-4-(trans-4-pentylcyclohexyl)-cyclohexyl]-cyclohexane.

EXAMPLE 38

A liquid crystal phase consisting of the following compounds is prepared:
20% of r-1-cyano-cis-4-(trans-4-butylcyclohexyl)-1-heptylcyclohexane,
21% of r-1-cyano-cis-4-(trans-4-pentylcyclohexyl)-1-pentylcyclohexane,
11% of trans,trans-4'-methoxycyclohexyl-4-propylcyclohexane,
10% of trans,trans-4'-ethoxycyclohexyl-4-propylcyclohexane,
4% of trans,trans-4-propylcyclohexylcyclohexane-4'-carboxylic acid-trans-4-propylcyclohexylester,
4% of trans,trans-4-propylcyclohexylcyclohexane-4'-carboxylic acid-trans-4-pentylcyclohexylester,
4% of trans,trans-4-butylcyclohexylcyclohexane-4'-carboxylic acid-trans-4-propylcyclohexylester,
4% of trans-trans-4-butylcyclohexylcyclohexane-4'-carboxylic acid-trans-4-pentylcyclohexylester and
22% of 1-cyano-1-(5-propyl-1,3-dioxan-2-yl)-cis-4-(trans-4-pentylcyclohexyl)-cyclohexane.

EXAMPLE 39

A liquid crystal phase consisting of
20% of r-1-cyano-cis-4-(trans-4-butylcyclohexyl)-1-heptylcyclohexane,
21% of r-1-cyano-cis-4-(trans-4-pentylcyclohexyl)-1-pentylcyclohexane,
11% of trans,trans-4'-methoxycyclohexyl-4-propylcyclohexane,
10% of trans,trans-4'-ethoxycyclohexyl-4-propylcyclohexane,
4% of trans,trans-4-propylcyclohexylcyclohexane-4'-carboxylic acid-trans-4-propylcyclohexylester,
4% of trans,trans-4-propylcyclohexylcyclohexane-4'-carboxylic acid-trans-4-pentylcyclohexylester,
4% of trans,trans-4-butylcyclohexylcyclohexane-4'-carboxylic acid-trans-4-propylcyclohexylester,
4% of trans,trans-4-butylcyclohexylcyclohexane-4'-carboxylic acid-trans-4-pentylcyclohexylester and
22% of r-1-cyano-cis-4-(trans-4-pentylcyclohexyl)-1-(trans-4-pentylcyclohexyl)-cyclohexane
has a melting point of −3°, a clear point of 100° and a optical anisotropy of 0.0437. This phase is particularly suitable as host for pleochroitic dyes, in particular for azo dyes. The guest-host mixtures are particularly suitable for GH displays with positive contrast.

The LC phases described in Examples 5 to 12, 15 to 21, 29 and 31 to 36 are particularly suitable as wide-range mixtures, while the LC phases described in Examples 1 to 4, 13, 14 and 30 are particularly suitable for guest-host displays with positive contrast.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid crystal electro-optical display element with a steep characteristic transmission line and containing a liquid crystal phase comprising at least one compound from Group B of the formulae V or VI

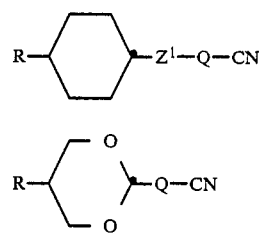

wherein R is alkyl of 1 to 12 C atoms or alkyl of 1–12 C atoms wherein one or two non-adjacent $CH_2$ groups are replaced by —O—, —CO—, —O—CO— or —CO—O—, Q is

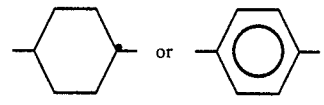

and $Z_1$ is

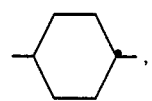

a single bond, —$CH_2CH_2$—, —CO—O— or —O—CO, and at least one other liquid crystal compound, the improvement wherein at least one compound of the formula IXd,

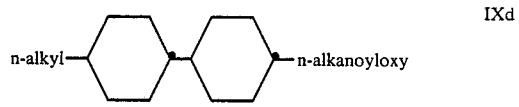

wherein n alkyl and n-alkanoyloxy have in each case 2 to 7 C atoms, is added to said liquid crystal phase.

2. A display element according to claim 1, which also contains as a liquid crystal compound at least one compound from Group D and/or from Group E; Group D comprising compounds of the formulae XI to XIII

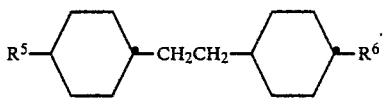   XI

   XII

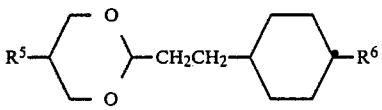   XIII wherein $R^5$ and $R^6$ are each independently alkyl of 1 to 12 C atoms, or alkyl of 1–12 C atoms, wherein one or two nonadjacent CH₂ groups are replaced by —O—, —CO—, —O—CO— or —CO—O—, and Group E comprising compounds of the formulae XIV or XV

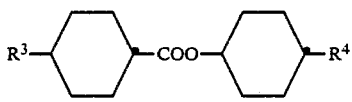   XIV

   XV wherein $R^3$ and $R^4$ are each independently R or

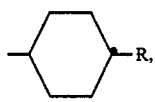

$R^9$ is R,

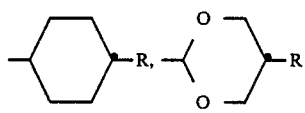

or, when n is 2, also CN, R is as defined in claim 1, n is 2 or, when $R^3$ is

also 1, and A is 1,4-phenylene or 1,4-phenylene which is fluorinated in the 2- or 3-position.

3. A display element according to claim 1, which contains at least one compound of the formula IX

   IX wherein $R^3$ is alkyl of or 1 to 12 C atoms and $R^4$ is —R, —OR, —COOR or —CH₂OR, R being alkyl of 1 to 12 C atoms.

4. A display element according to claim 1, which contains at least one compound of the formulae

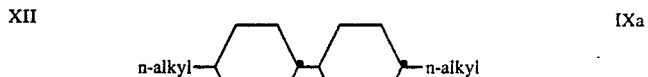   IXa

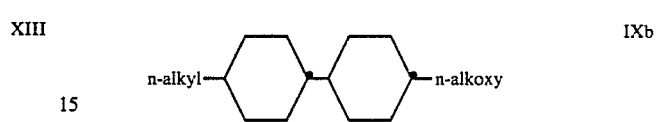   IXb

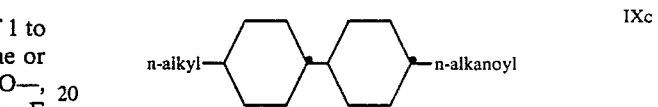   IXc

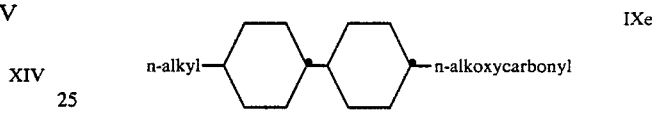   IXe

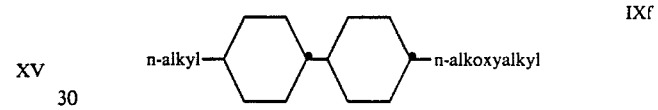   IXf wherein n-alkyl, n-alkoxy, n-alkanoyl, n-alkoxycarbonyl and n-alkoxyalkyl have in each case 1 to 10 C atoms.

5. A display element of claim 1, which contains at least one compound of formula IXd, wherein n-alkanoyloxy is n-hexanoyloxy or n-butyryloxy.

6. A display element of claim 1, which contains 12 to 70% of compounds of formula IXd.

7. A display element of claim 3, which contains 12 to 70% of compounds of formulae IX and IXd.

8. A display element of claim 2, containing a weight amount of at least one compound of the formula XV from Group E which is less than 30%.

9. A display element of claim 1, having a positive dielectric anisotropy and containing 15–60% wt% of compound(s) of Group B.

10. A display element of claim 1, containing at least one compound of Group B of the formulae

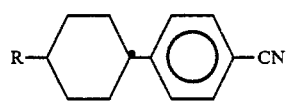

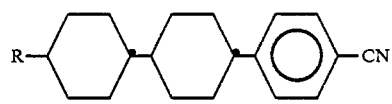

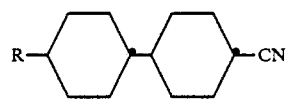

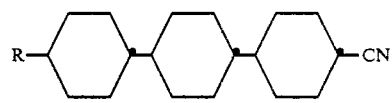

-continued
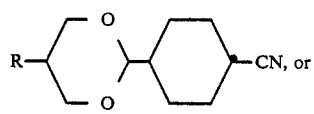
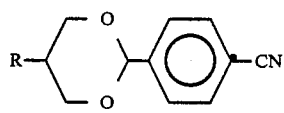
11. A display element of claim 1, containing at least two compounds of the formulae
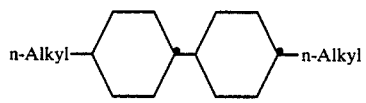
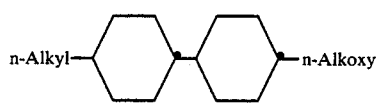
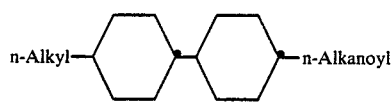
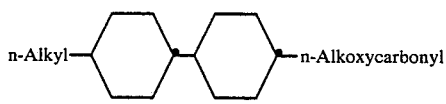
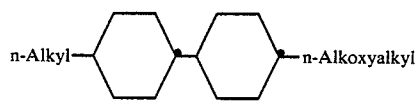
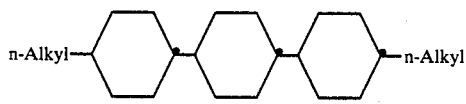
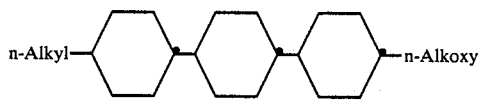
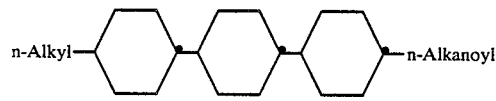
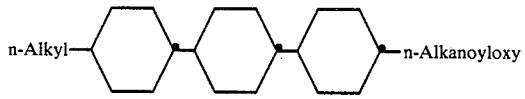
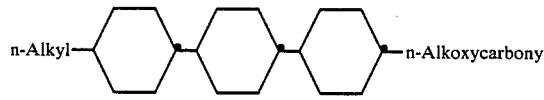
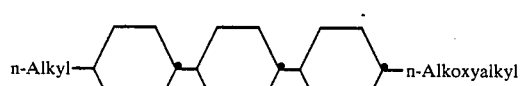
12. A display element of claim 1, containing at least one compound of the formulae
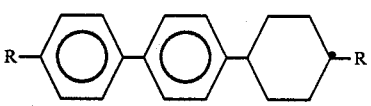
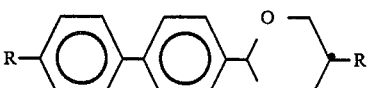
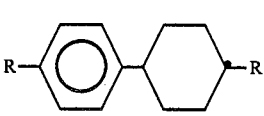
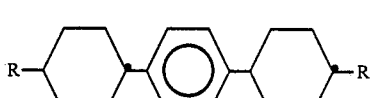
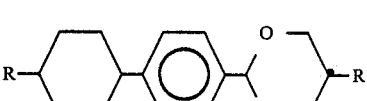
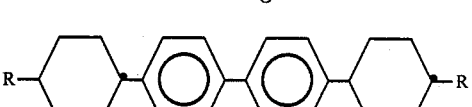
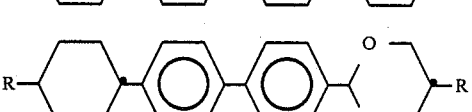
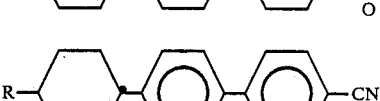
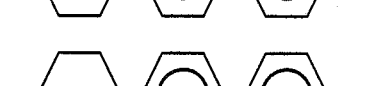
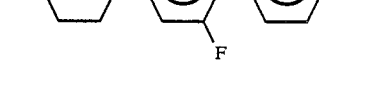
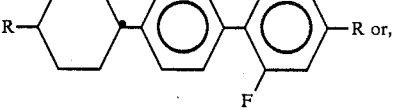
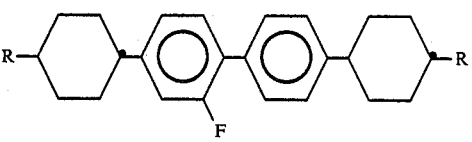
13. A display element of claim 1, containing compounds having branched alkyl groups wherein all branched alkyl groups contain only one chain branching.
* * * * *